United States Patent
Workman et al.

(10) Patent No.: US 7,398,153 B2
(45) Date of Patent: Jul. 8, 2008

(54) PORTABLE MOTION-ACTIVATED POSITION REPORTING DEVICE

(75) Inventors: Dennis Workman, Morgan Hill, CA (US); Jeffery Allen Hamilton, Broomfield, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 620 days.

(21) Appl. No.: 11/096,923

(22) Filed: Mar. 31, 2005

(65) Prior Publication Data

US 2006/0224306 A1    Oct. 5, 2006

(51) Int. Cl.
G08B 25/08    (2006.01)
G01C 21/00    (2006.01)

(52) U.S. Cl. .................. 701/207; 701/213; 340/988; 342/357.07

(58) Field of Classification Search .............. 701/207, 701/200, 201, 210, 213, 35; 340/988, 573.1, 340/572.1, 995.25; 342/357.13, 357.01, 342/357.07, 357.1
See application file for complete search history.

(56) References Cited

U.S. PATENT DOCUMENTS

| 5,650,770 | A | 7/1997 | Schlager et al. |
|---|---|---|---|
| 5,917,405 | A | 6/1999 | Joao |
| 5,919,239 | A * | 7/1999 | Fraker et al. ............. 701/35 |
| 6,300,875 | B1 * | 10/2001 | Schafer ............ 340/573.1 |
| 6,801,853 | B2 | 10/2004 | Workman |
| 6,864,789 | B2 | 3/2005 | Wolfe |
| 2002/0070856 | A1 | 6/2002 | Wolfe |
| 2005/0030175 | A1 | 2/2005 | Wolfe |
| 2005/0179541 | A1 | 8/2005 | Wolfe |

FOREIGN PATENT DOCUMENTS

| WO | WO-03/007261 | 1/2003 |
|---|---|---|
| WO | WO-2004/017272 | 2/2004 |
| WO | WO-2004/083888 | 9/2004 |
| WO | WO/2005/017846 | 2/2005 |

OTHER PUBLICATIONS

"Highland Man's Invention Success With Dewalt", http://www.heraldextra.com/content/view/195674/4/, (Oct. 8, 2006),3.

* cited by examiner

Primary Examiner—Tan Q Nguyen

(57) ABSTRACT

The present invention is a portable motion-activated position reporting device. In one embodiment, a controller is coupled with an interrogator component, a position determining component, a wireless communications component, and an initiating component. In one embodiment, the initiating component detects motion of the position reporting device and generates a signal to the controller indicating the motion. The controller, in response to the signal, activates the interrogator component and the position reporting device.

31 Claims, 4 Drawing Sheets

PORTABLE MOTION-ACTIVATED POSITION REPORTING DEVICE

RELATED APPLICATIONS

The present invention benefits from U.S. Pat. No. 6,801,853 (U.S. patent application Ser. No. 10/222,532 filed Aug. 15, 2002) titled "A Portable Motion-Activated Position Reporting Device," by Dennis Workman, assigned to the assignee of the present invention, and which is hereby incorporated by reference in its entirety herein.

The present invention benefits from U.S. patent application Ser. No. 11/097,425 filed Mar. 31, 2005 titled "Geographic Marking Device with RFID Transponder," by Jeff Hamilton, assigned to the assignee of the present invention, and which is hereby incorporated by reference in its entirety herein.

FIELD OF THE INVENTION

Embodiments of the present invention are related to a device for determining and reporting the position of a person or object.

BACKGROUND OF THE INVENTION

Position reporting devices are frequently used to locate and report the position of a person or object. A typical position reporting device combines a navigation system such as the Global Positioning System (GPS) module with a mobile communications system such as a cellular modem to determine the position or geographic location of a person or asset being tracked and report their position to a tracking facility. Position reporting devices are used in a variety of systems in which timely position information is required such as fleet tracking and asset recovery systems.

Fleet tracking systems allow a user to monitor the position of a ship or vehicle carrying a position reporting device. For example, the course of a vehicle being tracked can be inferred using successive position fixes sent by the position reporting device. In a similar manner it can be inferred that the vehicle is not moving when successive position fixes report the same position. Fleet tracking systems are commonly used by delivery services for routing and dispatching of vehicles. Asset recovery systems report the position of stolen or missing property (e.g., a stolen car) to a service provider or to the police in order to facilitate recovering the property.

However, many potential users find the cost of position reporting devices prohibitive compared to the value of the asset being tracked. Many position reporting devices have a manufacturing cost in the range of $200-$300 and a market price in the range of $500-$600. Thus, the use of position reporting devices has typically been limited to high value items such as cars or other vehicles.

Another drawback associated with position reporting devices is the amount of power they consume. While battery powered position reporting devices do exist, the amount of power they consume when turned on necessitates frequent battery changes in order to continue operating. This makes using position reporting devices inconvenient to some users in that they require an excessive amount of maintenance to continue operating.

Because rental fleets typically rent only a fraction of all of their vehicles at any given time. For example, a rental fleet of 500 vehicles may, on average, have only 300 vehicles rented at a given time. As a result, there is typically no need for a dedicated position reporting device for each vehicle. Therefore, a dedicated position reporting device for each vehicle is not needed and can be expensive to purchase and maintain.

SUMMARY OF THE INVENTION

Accordingly, a need exists for a low-cost portable position reporting device which is small enough to be easily concealed upon an asset which is being tracked. While meeting the above need, it is desirable to provide a position reporting device which requires minimal installation and maintenance on the part of a user and which can be easily moved from one asset to another as needed. Furthermore, a need exists for quickly and accurately identifying which asset is being tracked after the position reporting device has been moved to another asset. While meeting the above needs, a further need exists for a position reporting device with a self contained power source to enable the tracking of assets which can not supply power to the position reporting device. Furthermore, a need exists for a method for reducing the power consumption of the above stated device to extend the usable life of the power source and thus minimize the maintenance needs of the device. Furthermore, a need exists for quickly and accurately identifying which asset is being tracked The present invention is a portable motion-activated position reporting device. In one embodiment, a controller is coupled with an interrogator component, a position determining component, a wireless communications component, and an initiating component. In one embodiment, the initiating component detects motion of the position reporting device and generates a signal to the controller indicating the motion. The controller, in response to the signal, activates the interrogator component and the position reporting device. Upon being activated, the interrogator component automatically receives the identity of the asset being tracked.

In embodiments of the present invention, the identity of an asset which is being tracked is stored on a data storage device which is disposed with that asset. In embodiments of the present invention, the data storage device may be coupled with the asset which is being tracked. The data storage device conveys the identity of the asset being tracked to the position reporting device. In embodiments of the present invention, the data storage device communicates with the interrogator of the position reporting device using a wireless communication system.

The position monitoring device uses the interrogator component to wirelessly access the identity of the vehicle when movement of the position monitoring device is detected. As a result, there is no requirement for a human to manually match the identification number of the vehicle with the identification number of the position reporting device. This, facilitates moving the position reporting device from one asset to another by reducing the amount of time needed to identify which asset is being monitored by a particular position reporting device. Additionally, embodiments of the present invention reduce the likelihood of a transcription error when recording the identification numbers of the vehicle and position reporting device and/or matching them in a database.

Because embodiments of the present invention facilitate moving a position reporting device between a plurality of assets, the cost of operating the position reporting device because a single device can be used to monitor a plurality of assets. Consequently, the need for a dedicated position reporting device for each asset being monitored is reduced.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Figure 1:
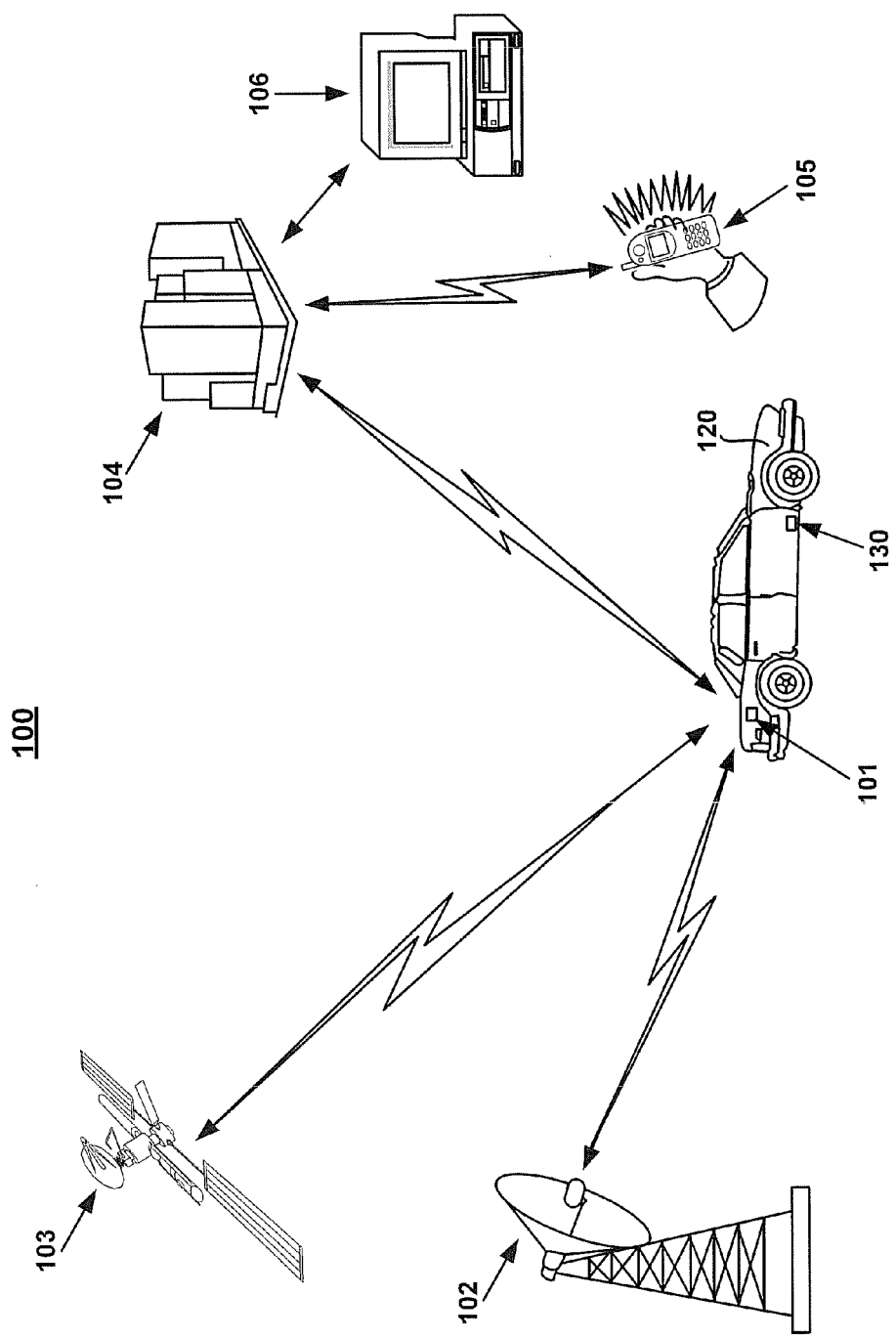
FIG. 1 is a diagram of a position tracking system utilized in accordance with embodiments of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

The present invention is a portable motion-activated position reporting device and a system utilizing this device to automatically identify an asset being monitored. Embodiments of the present invention may be to monitor the position of an asset (e.g., property or a person) and can be used to detect and report unauthorized movement of the asset and in recovering it when unauthorized movement occurs. Embodiments of the present invention may utilize a geo-fencing system in which a set of position coordinates are provided which define an area in which the asset can be moved without triggering an alarm. When the asset is moved outside of the position coordinates, a monitoring service notifies the owner of the asset and/or law enforcement agencies in order to facilitate recovering the asset.

Embodiments of the present invention utilize an initiating component to detect movement of the device and send a signal which initiates activating the device when the asset it is monitoring is moved. This extends the battery life of the reporting device by allowing it to remain in an operating state which draws a minimal amount of power until movement of the device is detected. When movement is detected, the device automatically transitions to an active operating state and determines its geographic location using a position determining system and transmits this position to the monitoring service. Embodiments of the present invention further utilize an automatic identification system to identify an asset which is being monitored by the position reporting device. This facilitates moving the position reporting device from one asset to another without the need to manually record the identification number of the asset. When the position monitoring device is activated, it can wirelessly communicate with a data storage device to access the identify the asset which is being monitored. The position reporting device can also store geographic position information on the data storage device.

FIG. 1 is a diagram of a position tracking system 100 utilized in accordance with embodiments of the present invention. System 100 comprises a position reporting device 101, a position determining system (e.g., position determining system 102 or 103), and a position tracking service provider 104. In the embodiment of FIG. 1, reporting device 101 is carried in a vehicle 120 and is used to report its position to service provider 104 or to a user. In the embodiment of FIG. 1, device 101 is used to monitor and report the position of an asset (e.g., vehicle 120). While FIG. 1 shows position reporting device 101 being used to report the position of a vehicle, the present invention is well suited to monitor and report the position of a variety of assets which a user may want monitored. When vehicle 120 is moved, device 101 detects the movement, determines its geographic location using position determining system 102 or 103, and reports its position, and thus the position of vehicle 120, to service provider 104.

Also shown in FIG. 1 is a data storage device 130. In embodiments of the present invention, data storage device 130 comprises a radio frequency identification (RFID) tag. RFID is a type of automatic identification technology which typically uses radio waves to transmit the identity of a person or object. A typical RFID tag (e.g., 130) comprises a microchip which is coupled with an antenna and is mounted on a substrate. For the purposes of the present invention, data storage device 130 will be referred to as RFID tag 130. However, embodiments of the present invention are not limited to this type of data storage device alone and may use another data storage devices and transmission apparatus. In embodiments of the present invention, RFID tag 130 is coupled with vehicle 120 using, for example, a mechanical fastener. RFID tag 130 thus stays with vehicle 120 when it is moved. In another embodiment, RFID tag may simply be placed in vehicle 120 is a place where it is not likely to be disturbed.

Passive RFID tags do not have a power source or transmitter. Instead, they gather electromagnetic energy from an interrogating device (e.g., geographic data interrogator 110). The microchip within the RFID tag then uses this energy to change the load on the antenna to reflect back an altered signal which conveys information to the interrogating device.

Active RFID tags have a transmitter and a power source such as a battery. The power source is used to run the circuitry of the RFID tag and to transmit a signal to an interrogating device. Active RFID tags may either be transponders, which "wake up" when they detect a signal from an interrogating device, or beacons which emit a signal at pre-set intervals.

Semi-active RFID tags draw power from a power source to run the circuitry of the RFID tag but communicate by drawing power from the electromagnetic energy emitted by the interrogating device. Typically, active and semi-active RFID tags cost more than passive RFID tags but have a greater transmitting range. In embodiments of the present invention, RFID tag 130 may comprise an active, semi-active, or passive RFID tag.

RFID tags may also be classified in the way data is stored, or accessed. Read only RFID tags have information stored on them during the manufacturing process which cannot be changed or appended in the field. Read/write RFID tags information can be added to, or written over, existing information on the tag. Typically, a serial number written on the tag at the time of manufacture cannot be written over. Additionally, some information that is subsequently written to the tag may be locked to prevent overwrite. Write once, read only (WORM) tags can only be written to once, and thereafter can only be read. In embodiments of the present invention RFID tag 130 may be a read only RFID tag, read/write RFID tag, or a WORM RFID tag.

In embodiments of the present invention, RFID tag 130 is used to store information which uniquely identifies an asset (e.g., vehicle 120). For example, the serial number of vehicle 120, or another unique identification of the asset, is stored by RFID tag 130. In another embodiment, RFID tag 130 has a unique identification which is permanently stored thereupon when manufactured. When RFID tag 130 is placed in vehicle 120, it is associated with vehicle 120 in, for example, a database maintained by service provider 104 of by a user of system 100.

In operation, when position reporting device detects movement, it automatically accesses the identity of the asset being monitored from RFID tag 130. This information can be sent when a position report is sent to service provider 104. As a result, the identity of the asset being monitored and its geographic position is reported to service provider 104 when a change in the state of motion of the asset is detected.

Figure 2:
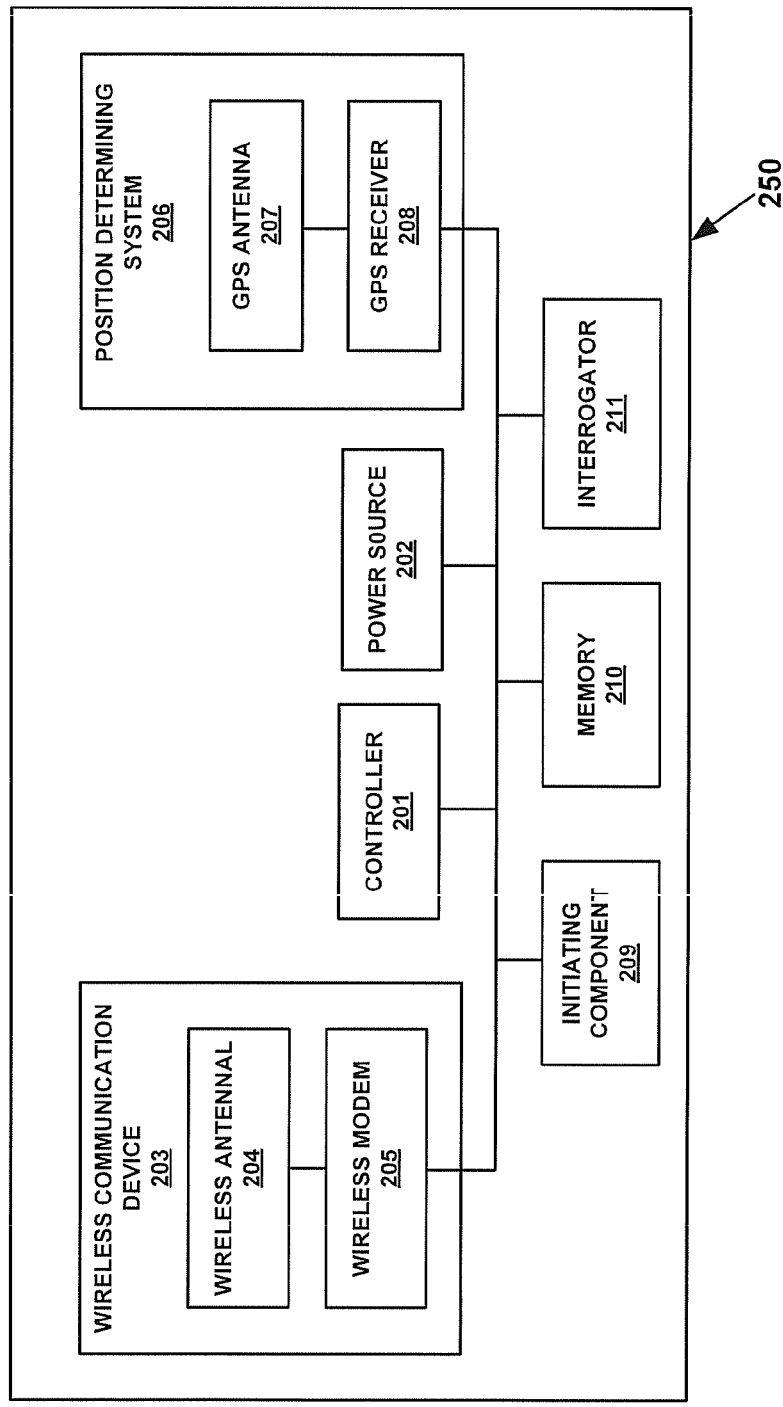
FIG. 2 is a block diagram of an exemplary portable motion-activated position reporting device in accordance with embodiments of the present invention.

FIG. 2 is a block diagram of an exemplary position reporting device 101 utilized in accordance with embodiments of the present invention. In FIG. 2, a controller 201 is coupled with a power source 202. Controller 201 is for receiving and executing commands for determining a geographic location and for transmitting that position to service provider 104. In one embodiment, power source 202 is a long term power source such as a battery or plurality of batteries (e.g., 4 alkaline AA batteries). However, while the present embodiment recites a long term power source, the present invention is well suited for utilizing other power sources as well. In embodiments of the present invention, power source 202 may be coupled with an external power source such as the electrical system of vehicle 120. For example, power source 202 may be hard wired to the electrical system of vehicle 120, or may be coupled to an accessory outlet or cigarette lighter outlet in vehicle 120 using an adapter plug.

Controller 201 is also coupled with a wireless communications component 203 and a position determining component 206. Wireless communications component 203 is for transmitting and receiving wireless messages (e.g., data and commands). In one embodiment, wireless communications component is comprised of a cellular wireless antenna 204 and a cellular wireless modem 205. In one embodiment, device 101 sends and receives messages using the Short Message Service (SMS). However, the present invention is well suited to utilize other message formats as well.

Position determining system 206 is for determining the location of device 101. In embodiments of the present invention, position determining component 206 comprises a Global Positioning System (GPS) antenna 207 and a GPS receiver 208. However, while the present embodiment specifically recites a GPS position determining system, the present invention is well suited to utilize a variety of terrestrial-based and satellite-based position determining systems as well.

In FIG. 2, controller 201 is also coupled with an initiating component 209. Initiating component 209 is for detecting changes in the state of motion of device 101. In one embodiment, initiating component 209 detects the vibration associated with the movement of device 101 and indicates this movement to controller 201 when changes in the vibration of device 101 are detected. In other embodiments of the present invention, initiating component 209 may be an acceleration sensor, a tilt sensor, a rotation sensor, a gyroscope, and a motion sensor. However, while the present embodiment recites these particular implementations of initiating component 209, the present invention is well suited to utilize a variety of devices for detecting movement of device 101 and for generating a signal to controller 201 indicating this movement.

In accordance with embodiments of the present invention, initiating component 209 detects when device 101 transitions from a substantially stationary state to a moving state. Initiating component 209 can also detect when device 101 transitions from a moving state to a substantially stationary state and/or changes in the rate of movement of device 101. Thus, in embodiments of the present invention, initiating component 209 detects changes in the state of motion of device 101 such as starting or stopping of motion, as well as acceleration/deceleration and generates an interrupt to controller 201. In response to the interrupt received from initiating component 209, controller 201 changes the operating state of device 101 from an idle operating state, in which a few components of device 101 draw a minimal amount of power from power source 102, to an active operating state in which other components of device 101 draw additional power from power source 202.

Utilizing an initiating component which detects movement with a position reporting device is seemingly counter-intuitive or at least redundant in the current position reporting environment which relies upon successive position fixes to imply movement of the reporting device. For example, receiving a series of position reports which come from different locations implies that the position reporting device is in motion. Alternatively, receiving a series of position reports which come from the same location implies that the position reporting device is stationary. Therefore, it was considered redundant to incorporate a motion detecting component into a device which already had an implied function of detecting motion.

Coupling initiating component 209 with position reporting device 101 is advantageous because it reduces the amount of time that device 101 is activated in order to provide position fixes to service provider 104 and thus extends the battery life of the device. In prior art position reporting devices, determining whether the device was moving or stationary depended upon determining and comparing successive position fixes. If successive position fixes were from the same location, it was inferred that the device was stationary and if successive position fixes were from different locations, it was inferred that the device was in motion. These position fixes had to be provided at a regular interval in order to provide timely notification that the device was being moved. However, providing successive position fixes for a device which has not moved is an unnecessary drain of battery power, especially when the device remains stationary for extended periods of time. This in turn is burdensome to users of the device who are required to frequently replace the batteries of the position reporting device or to couple the device to an external power source.

Many users lack the expertise necessary to couple a position reporting device to their vehicle's electrical system and therefore decide not to use one. Additionally, many potential users have indicated that they are not willing to alter the electrical system of their vehicle in order to install a position reporting device. The present invention overcomes these obstacles by using a self contained power source and providing a method for reducing the power consumption of the position reporting device in order to simplify maintaining the device. Embodiments of the present invention overcome these limitations by providing a battery powered position reporting device which draws minimal power when the device is not being moved and thus extends the battery life of the device.

Controller 201 is also coupled with a memory 210. Memory 210 can be used for storing instructions and position information which has been determined by position determining component 206. This allows embodiments of device 101 to store a log of positions it has been at over a period of time.

Interrogator 211 is for wirelessly communicating with RFID tag 130 and for accessing information (e.g., a serial number or other identification of an asset such as vehicle 120) stored thereon. Furthermore, interrogator 211 conveys this information to controller 201 which can then initiate sending this information to service provider 104. Interrogator 211 is also for wirelessly conveying data (e.g., geographic position data) to RFID tag 130 which may be stored thereupon.

In embodiments of the present invention, controller 201, power source 202, wireless communications component 203, position determining component 206, initiating component 209, memory 210, and interrogator 211 are disposed within a housing 250. Housing 250 defines a portable package which allows device 101 to be easily concealed in or upon the asset which it is monitoring.

It is important for device 101 to be small enough to be easily concealed from observation. If position reporting device 101 is so large as to be readily apparent, it may be vandalized or discarded by someone trying to steal the asset being monitored. Current GPS receivers are in the range of approximately one inch by one inch (1"×1") by a few millimeters in thickness. Current cellular modems are now approximately three and one half by two inches (3½"×2") by a few millimeters in thickness. Thus, in one embodiment, device 101 may be as small as three by four inches (3"×4") by less than an inch in thickness. This size allows device 101 to be easily concealed in a glove box, under a car seat, or in the trunk of a vehicle. Additionally, device 101 is portable enough to be concealed in, for example, a briefcase or backpack as well.

Because device 101 may be left unattended for extended periods of time while monitoring an asset, the necessity for a user interface upon device 101 is minimal. For example, device 101 may include an LED (not shown) to indicate that position determining component 106 is receiving a signal and an LED (not shown) to indicate that wireless communications component 103 is receiving a signal.

Thus, in embodiments of the present invention, position reporting device 101 is a small form factor, portable device which can determine its position and transmit this information to service provider 104. Additionally, in embodiments of the present invention, device 101 is powered by a battery or plurality of batteries. This is advantageous because it allows a user to utilize device 101 quickly and with a minimum of maintenance. For example, a user does not need expertise in electronics to couple device 101 with the electrical system of vehicle 120 and does not need the services of a third party in order to install device 101. Additionally, because embodiments of device 101 utilize a self contained power supply, it can be used to monitor the position of assets which do not usually have their own power supply such as golf clubs, a backpack, a briefcase, etc. Embodiments of the present invention utilize an initiating component which detects when the device is being moved and generates a signal which initiates activating the device. This reduces the power consumption of the present invention and therefore extends the battery life of the position reporting device.

Figure 3:
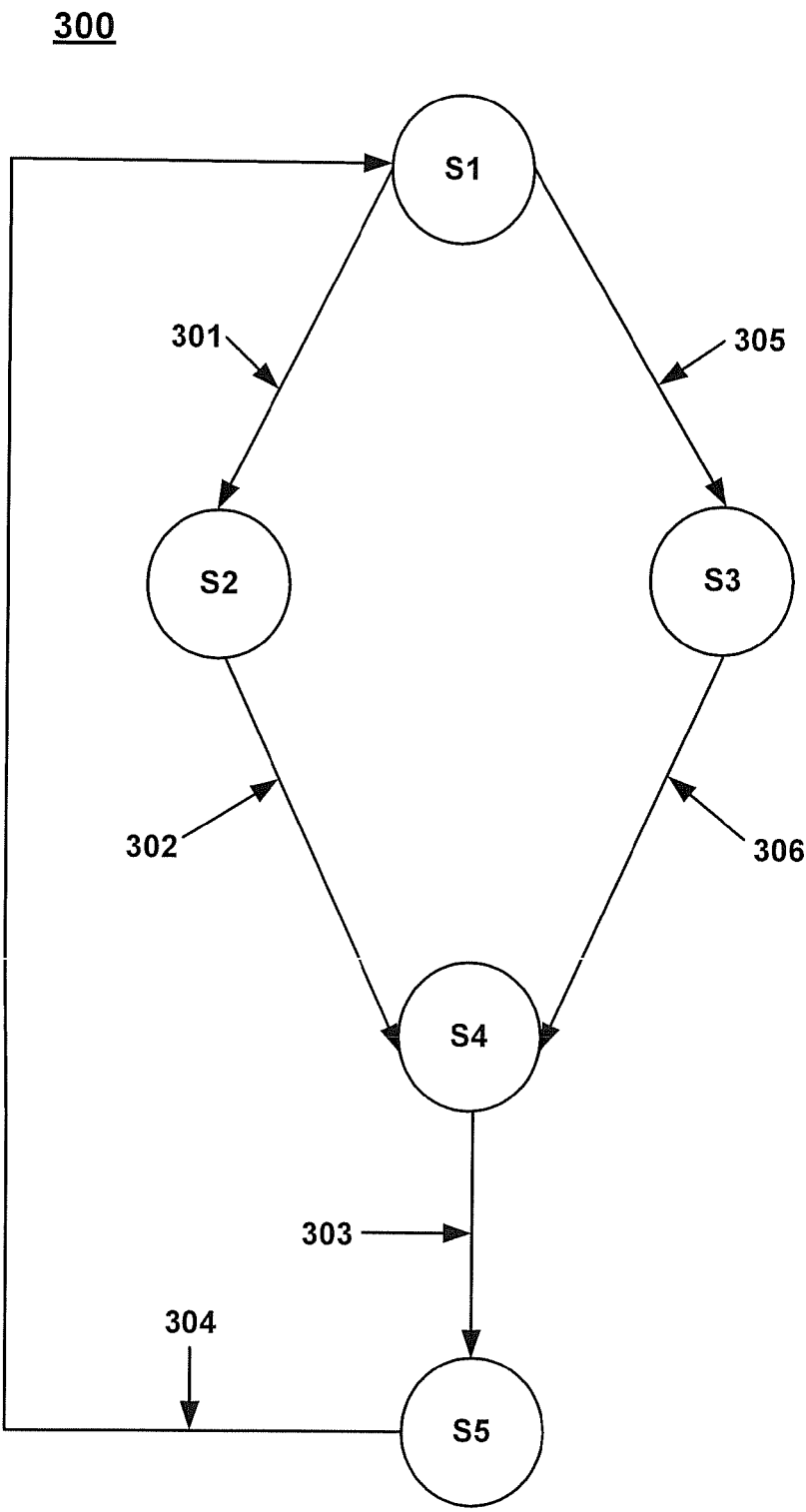
FIG. 3 is a diagram showing the operating states of a portable position reporting device utilized in accordance with embodiments of the present invention.

FIG. 3 is a diagram showing the operating states of a portable position reporting device 101 in accordance with embodiments of the present invention. In operating state S1 of FIG. 3, device 101 is in an idle operating state. In embodiments of the present invention, when device 101 is in its idle state the only components drawing power are a real time clock and the initiating component (e.g., initiating component 209 of FIG. 2). This allows device 101 to remain in an operating state in which a minimal amount of power is drawn from power source 202. In embodiments of the present invention, as little as 10 μA are drawn while device 101 is in idle operating state S1. Because battery drain is minimized in operating state S1, the battery replacement interval for device 101 is extended.

At event 301 of FIG. 3 initiating component 209 detects movement and generates an interrupt to the controller of device 101 (e.g., controller 201 of FIG. 2). In response to the interrupt from initiating component 209, controller 201 causes device 101 to transition to operating state S2. Operating state S2 is an active operating state of device 101 in which device 101 will attempt to attain a position fix of its geographic location using a position determining component 206. In embodiments of the present invention, when device 101 is in operating state S2 wireless communications component 203, position determining component 206, and interrogator 211 draw power from power source 202. Controller 201 causes interrogator 211 to attempt to communicate with an RFID tag (e.g., 130) which is in range of device 101. If communication with RFID tag 130 is initiated, the serial number or other identification of an asset (e.g., vehicle 120) is wirelessly conveyed to interrogator 211. Controller 201 also causes component 206 to attempt to determine the location of device 101 and, if successful, to transmit the position of vehicle 120 the identification number off vehicle 120 (e.g., received via interrogator 211) and/or a serial number of device 101, to service provider 104 via wireless communications component 203. In embodiments of the present invention, current drain during operating state S3 is estimated to be 70 mA while device 101 is determining its location and 400 mA while transmitting its position.

At event 302 of FIG. 3, device 101 transitions to operating state S4. In accordance with embodiments of the present invention, device 101 transitions to operating state S4 from operating state S2 after successfully transmitting its position, or after a pre-determined time period. For example, if device 101 successfully determines its location using component 206, it then transmits its position to service provider 104. Alternatively, if a pre-determined time period expires before device 101 successfully determines its position, device 101 will transmit a message to service provider 104 conveying that it has been moved but was not able to determine its position using component 206 and then transition to operating state S4. The pre-determined time period can be a default setting, set by the user of device 101, or by service provider 104.

While in operating state S4, device 101 is in a query state and can receive commands and operating parameters from service provider 104. At this time, operating parameters of device 101 can be changed. For example, the time period in which component 206 is allowed to determine the position of device 101 can be changed during operating state S4. In one embodiment, while device 101 is in operating state S4, only wireless communications component 203 draws power from power source 202. Again, this reduces the amount of power drawn from power source 202 and extends the battery life of device 101. It is estimated that in embodiments of the present invention device 101 draws approximately 5 mA of power while in operating state S4.

After receiving commands and/or operating parameters from service provider 104, device 101 transitions to operating state S5 at event 303. Operating state S5 is a delay state in which device 101 is forced to remain idle for a pre-determined time period. This sets a time interval for repeated position fixes of device 101 and prevents device 101 from drawing excessive battery power from power source 202 in attempting to constantly determine its position while it is being moved. In embodiments of the present invention, device 101 draws as little as 10 μA of power while in operating state S5. The pre-determined time period is an operating parameter which can be a default setting, set by the user of device 101, or by service provider 104.

The length of the pre-determined time period of operating state S5 can be changed during the query operating state (e.g., operating state S4) as a result of receiving operating parameters from service provider 104. In one embodiment, if service provider 104 determines that unauthorized movement of device 101 is occurring, the length of the time period can be changed during operating state S4 to cause device 101 to continuously or more frequently send its position to service provider 104. This facilitates locating and recovering the asset which device 101 is monitoring. After the pre-determined time period has expired, device 101 again enters operating state S1 at event 304 and can repeat the above described process if initiating component 209 detects that device 101 is being moved.

Alternatively, if a time period 305 expires before initiating component 209 detects movement, device 101 transitions to operating state S3. Time period 305 can be a default setting, a pre-determined parameter set by the user of device 101, or by service provider 104. In embodiments of the present invention, device 101 reports its status to service provider 104 while in operating state S3. This allows service provider 104 to verify that device 101 is still correctly operating. Information sent during operating state S3 may include the current time, position, operating parameters of device 101, and/or the identity of the asset being monitored. Additionally, device 101 can send battery status information during operating state S3. This allows service provider 104 to monitor the battery status of device 101 and inform the user of device 101 when the batteries need to be changed. For example, service provider can send an E-mail or other message to the user of device 101 reminding them to change the batteries of the device when necessary. In embodiments of the present invention, only wireless communications component 203 draws power from power source 202 in operating state S3. Current drain from power source 202 during operating state S3 is estimated to be 400 mA in embodiments of the present invention.

At event 306, device 101 transitions to operating state S4. As described above, in operating state S4, device 101 can receive commands and parameters from service provider 104. While in operating state S4, the length of time period 305 can be changed. After this, device 101 transitions to operating state S5 at event 303 in which device 101 remains in a forced idle state for a pre-determined time period. When the pre-determined time period expires, device 101 transitions to operating state S1 at event 304.

According to the power consumption figures cited above, and assuming that power source 202 comprises 4 AA alkaline batteries (assuming a 5000 mAh total capacity), it is estimated that device 101 should have a usable battery life of up to 6 months or more using current cellular and GPS technology. This assumes that the asset which device 101 is monitoring is in motion 2 hours a day and position determining component 206 is determining the geographic location of device 101 at 15 minute intervals. This is a significant increase in usable battery life over prior art position determining devices, especially for a portable device which is not coupled with an external power source.

Referring again to FIG. 1, in embodiments of the present invention, while device 101 is in idle operating state S1, it draws a minimum amount of power from its power source. For example, in one embodiment, device 101 only draws enough power to operate an initiating component and a real time clock. When the initiating component 209 detects movement, it generates an interrupt to controller 201. In response to this interrupt, controller 201 causes device 101 to transition to active operating state S2. Device 101 then automatically attempts to wirelessly access RFID tag 130 to determine the identity of the asset being monitored. Device 101 also attempts to automatically determine its position using a position determining system (e.g., position determining system 102 or 103). In accordance with embodiments of the present invention, position determining system 102 is a terrestrial-based position determining system. There are a variety of terrestrial-based position determining systems which can be utilized by embodiments of the present invention such as LORAN-C, Decca, radio beacons, etc. Furthermore, the present invention is well suited to utilize future implementations of terrestrial-based position determining systems.

In other embodiments of the present invention, device 101 utilizes a satellite-based position determining system 103 to determine its position. There are a variety of satellite-base position determining systems which can be utilized by embodiments of the present invention such as the Global Positioning System (GPS), Differential GPS (DGPS), Eurofix DGPS, the Global Navigation Satellite System (GLONASS), etc. Furthermore, the present invention is well suited to utilize future implementations of satellite-based position determining systems.

Typically, device 101 attempts to determine its position, as well as the serial number or other identification of the asset being monitored, within a pre-determined time period. If device 101 can not determine its position within the pre-determined time period, it will automatically transmit a "no-fix" message to position tracking service provider 104. The no-fix message conveys to service provider 104 that device 101 has detected movement of vehicle 120 and that its position could not be determined using a position determining system (e.g., position determining system 102 or 103) within the pre-determined time period. However, in embodiment of the present invention, the position of device 101 may be checked against the cellular ID sector information contained in the SMS message or roughly triangulated using a plurality of cellular towers.

When device 101 successfully determines its position within the pre-determined time period, it automatically sends a "fix" message to service center 104 providing the current time and present position of the device, as well as the serial number or other identification of the asset being monitored. Device 101 will then continue to periodically determine its position and send that position information to service provider 104 while initiating component 209 detects that device 101 is being moved. This allows service provider 104 to track device 101, and thus the asset that device 101 is monitoring, as it is being moved. The time period between position fixes is determined by the pre-determined time period of operating state S5 of FIG. 3.

In one embodiment, when initiating component 209 of device 101 detects that vehicle 120 is no longer being moved, it sends an interrupt to controller 201 indicating the lack of movement. In response to this indication, controller 201 causes device 101 to automatically determine its position, and to send this position information to service provider 104 along with the current time. Device 101 may also include information in this message indicating that it is no longer in motion.

Additionally, the fix and no-fix messages may contain additional information such as the current operating parameters and battery condition of device 101. By sending the battery condition information, the present invention reduces the amount of maintenance a user needs to perform to keep device 101 operating properly. For example, service provider 104 can send a message to the user reminding them to change the batteries in device 101 when it has determined that the batteries are low. In one embodiment of the present invention, a text message can be sent to the user's cell phone 105, or an E-mail message can be sent to the user's home or office computer 106 reminding them to change the batteries in device 101.

In embodiments of the present invention, when service provider 104 receives the position fix message from device 101, it compares the data in the message with a set of pre-determined position parameters set by the user of device 101. If the position of device 101 is outside of the pre-determined position parameters, a message can be sent to the user and/or law enforcement agencies telling them that the asset which device 101 is monitoring has been moved outside of the authorized position parameters. Additionally, service provider 104 can provide the position of device 101, as well as a description of the asset, to assist in recovering the asset. Additionally, service provider 104 can change the operating parameters of device 101 during operating state S4 so that position fixes are sent more often in order to assist in recovering the asset which is being monitored.

As an example, when a user initiates device 101, service provider 104 will ask for the authorized position of device 101 and may ask the user if they want to utilize geo-fencing. The user will provide the authorized position for device 101 and, if the user chooses to utilize geo-fencing, they may enter position parameters which specify an area in which device 101 is permitted to move without initiating a warning message to the user. If, for example, vehicle 120 is moved outside of this position or area, service provider 104 contacts the user and/or law enforcement agencies and informs them that unauthorized movement of vehicle 120 has occurred. Service provider 104 may send a text message to the user's cellular telephone 105, an E-mail to the user's computer 106, etc. As described above, service provider 104 may send commands which change the operating parameters of device 101 to cause it to send more frequent position reports when unauthorized movement of the asset is detected to assist in recovering the asset.

The user can also provide time parameters which specify time periods when device 101 may be at a particular position or within a specified area. For example, the user can provide the time and route of their daily commute. While commuting to work, the time and position information sent from device 101 tells service provider 104 that vehicle 120 is within its authorized area as specified by the time and position parameters. However, if vehicle 120 is moved at some other time than the user's specified parameters (e.g., 12 PM on a work day), service provider 104 will contact the user and/or law enforcement agencies to inform them that device 101 has detected unauthorized movement of vehicle 120.

In one embodiment, when device 101 is able to successfully determine its position using a position determining system, that position is logged in memory 210. A user could then use device 101 to track where vehicle 120 has been driven in a given time period. This can be used by, for example, car rental agencies or insurance companies in order to bill a customer according to their mileage within a given time period.

After sending a fix or no-fix message to service provider 104, embodiments of the present invention then enter query state S4 during which device 101 can receive commands and information from service provider 104. For example, if a user decides to change operating parameters of device 101, such as the time interval for attempting to determine its position from position determining system 102 or 103, the new parameters can be sent to device 101 at this time. As another example, service provider 104 can send a command for device 101 to send the contents of the position log stored in memory 210. Additionally, if unauthorized movement of vehicle 120 is detected, service provider 104 can send a command which changes the operating parameters of device 101 and causes it to, for example, send more frequent or constant position information in order to facilitate recovering vehicle 120.

In accordance with embodiments of the present invention, device 101 can also be configured to provide periodic status reports to verify to position tracking service provider 104 that it is operating correctly. For example, when a pre-determined time period has elapsed, the controller in device 101 causes the device to transition to active operating state S2 and to transmit a status report to service provider 104. Information contained in the status report can include the current time, the position of device 101, the current operating parameters, the battery status of device 101, and/or the identity of the asset being monitored. After sending a status report to service provider 104 device 101 enters the query state S4 as described above in order to receive commands and parameter information.

In embodiments of the present invention, device 101 may only send the serial number or other identification of vehicle 120 when it detects that it has been moved to a different vehicle. For example, a car rental agency which maintains a fleet of vehicles may move device 101 from a first car, which is not being used, to a second car which is about to be rented by a customer. Before the customer drives away with the vehicle, an employee of the rental agency can move device 101 from the first vehicle to the second vehicle. When device 101 is moved, initiating component 209 detects the movement, and causes the device to transition to an active operating state. As stated above, when device 101 transitions to an active operating state, interrogator 211 attempts to communicate with RFID tag 130. In the present example, interrogator 211 will communicate with the RFID tag in the first vehicle from which device 101 is being moved and receive identifying information from the RFID tag.

When device 101 is moved to the second vehicle, initiating component 209 again detects the movement, or the cessation of movement, of device 101. Device 101 is again caused to enter an active operating state wherein interrogator 211 automatically attempts to communicate with an RFID tag. In this instance, interrogator 211 is now communicating with the RFID tag of the second vehicle and automatically receives information which uniquely identifies the second vehicle. Device 101 then sends this identification, as well as geographic position data, to service provider 104. It is noted that in embodiments of the present invention, service provider 104 may be the owner of the asset being monitored. Thereafter, device 101 only sends geographic position data to service provider 104 until it detects that it has been moved to a new vehicle. Similarly, if device 101 determines that it cannot communicate with RFID tag 130, it may send a report to service provider 104 comprising the current time and geographic position of the device. Thus, if someone is stealing vehicle 120 and attempts to remove device 101 from the vehicle, a report is automatically sent which can facilitate notifying law enforcement agencies in recovering the vehicle.

Figure 4:
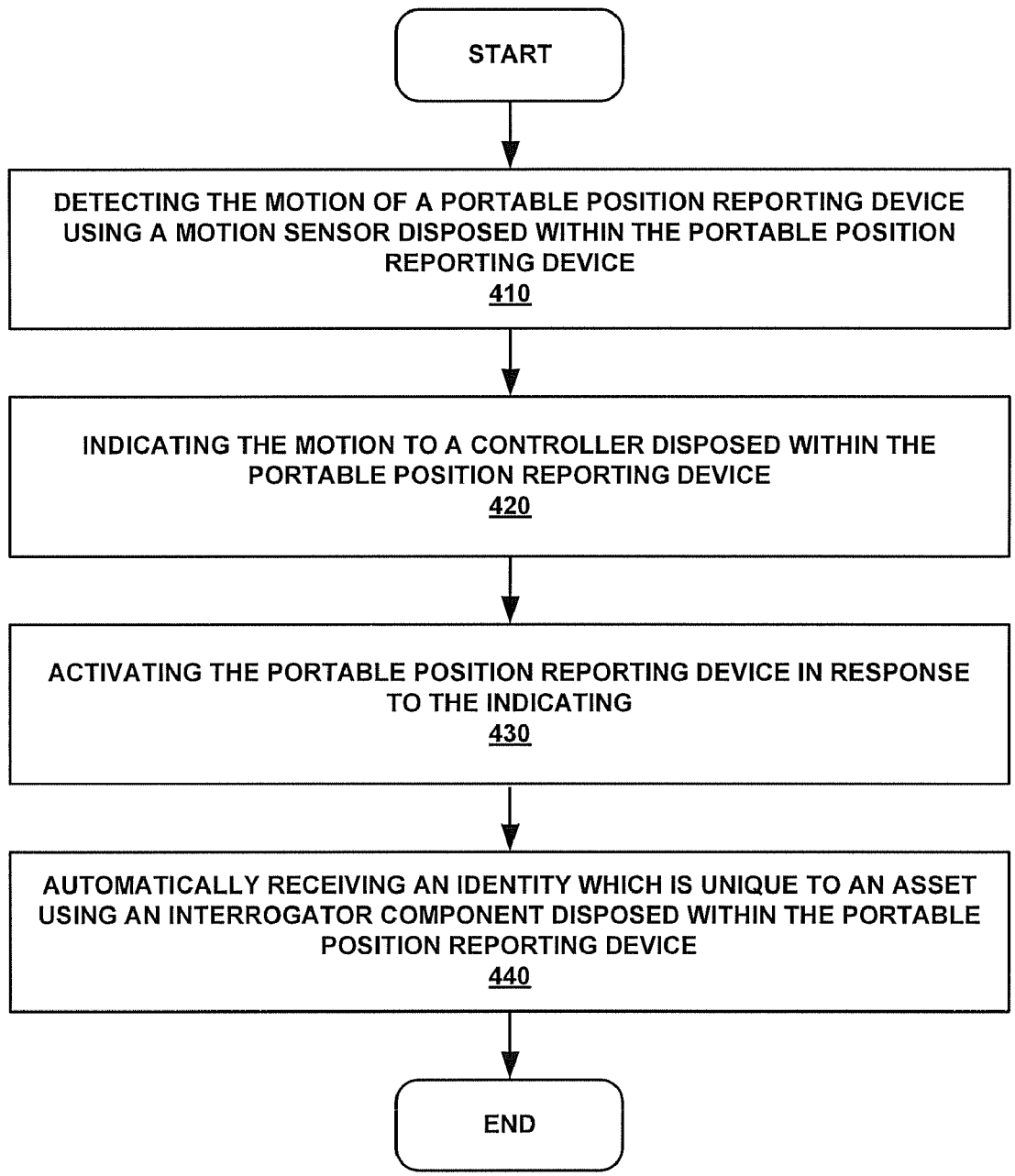
FIG. 4 is a flow chart of a method for monitoring the geographic position of an asset in accordance with embodiments of the present invention.

FIG. 4 is a flow chart of a method for monitoring the geographic position of an asset in accordance with embodiments of the present invention. In step 410 of FIG. 4, the motion of a portable position reporting device is detected using an initiating component disposed within the position reporting device. According to embodiments of the present invention, an initiating component (e.g., initiating component 209 of FIG. 2) is disposed within a housing (e.g., housing 250 of FIG. 2) of portable position reporting device 101. Initiating component 209 is for detecting changes in the state of motion of device 101. For example, initiating component 209 can detect when device 101 transitions from a moving state to a substantially moving state and/or changes in the rate of movement of device 101. Thus, in embodiments of the present invention, initiating component 209 detects changes in the state of motion of device 101 such as starting or stopping of motion, as well as acceleration/deceleration.

In step 420 of FIG. 4, the motion is indicated to a controller disposed within the portable position reporting device. In one embodiment, initiating component 209 detects the vibration associated with the movement of device 101 and indicates this movement to a controller 201 disposed within device 101 when changes in motion are detected.

In step 430 of FIG. 4, the portable position reporting device is activated in response the indicating of step 420. In embodiments of the present invention, when initiating component 209 detects movement it generates an interrupt to controller 201. In response to the interrupt from initiating component 209, controller 201 causes device 101 to transition to an active operating state (e.g., operating state S2 of FIG. 3).

Coupling an initiating component which detects motion with device 101 is a novel method of reducing power consumption because it allows device 101 to continuously monitor an asset while drawing a minimal amount of power from power source 202. In embodiments of the present invention, while device 101 is in an idle operating state, only a real time clock of controller 201 and initiating component 209 are drawing power. Device 101 does not attempt to determine its geographic location unless initiating component 209 detects that it is being moved. Thus, the number of position fixes, which draw far greater amounts of power, are minimized.

In step 440 of FIG. 4, an identity which is unique to an asset is automatically received using an interrogator component disposed within the portable position reporting device. In embodiments of the present invention, when initiating component 209 detects movement it generates an interrupt to controller 201. In response to the interrupt from initiating component 209, controller 201 causes device 101 to transition to an active operating state (e.g., operating state S2 of FIG. 3).

In embodiments of the present invention, while device 101 is in an idle operating state, only a real time clock of controller 201 and initiating component 209 are drawing power. Device 101 does not attempt to communicate with RFID tag 130 unless initiating component 209 detects that it is being moved. Thus, attempts to automatically determine the identity of the asset being monitored, which draw far greater amounts of power, is minimized.

In embodiments of the present invention, when device 101 is in an active operating state, interrogator component 211 attempts to communicate with RFID tag 130 in order to access information stored thereon which identifies the asset being monitored (e.g., vehicle 120). In other words, position reporting device automatically accesses identity information of a monitored asset in response to detecting movement of position reporting device 101. Because this is done in response to detecting movement of position reporting device 101, less power is drawn from power source 202, thus extending the life of the batteries.

Thus, embodiments of the present invention, a portable motion-activated position reporting device, are described. While the present invention has been described in particular embodiments, it should be appreciated that the present invention should not be construed as limited by such embodiments, but rather construed according to the following claims.

What is claimed is:

1. A portable motion-activated position reporting device comprising:
   a controller;
   an interrogator component coupled with said controller for automatically receiving an identity which is unique to an asset;
   a position determining component coupled with said controller and for determining a geographic location of said position reporting device;
   a wireless communications component coupled with said controller and for transmitting a message conveying said identity and said geographic location; and
   an initiating component coupled with said controller for generating a signal to said controller when said initiating component detects movement of said position reporting device, wherein said controller activates said interrogator component and said position reporting device in response to said signal.

2. The position reporting device of claim 1 further comprising a housing defining a portable package, wherein said controller, said interrogator component, said position determining component, said wireless communication component, and said initiating component are disposed within said housing.

3. The position reporting device of claim 1, wherein said position determining component determines said geographic location using a satellite-based position determining system.

4. The position reporting device of claim 1, wherein said position determining component determines said geographic location using a terrestrial-based position determining system.

5. The position reporting device of claim 1, wherein said controller automatically causes said position determining component to determine said geographic location and causes said interrogator component to receive said identity when said position reporting device is activated in response to said signal.

6. The position reporting device of claim 5 wherein said controller automatically causes said wireless communications component to transmit said message when said geographic location is determined within a pre-determined time parameter.

7. The position reporting device of claim 6 wherein said controller causes said wireless communications component to transmit a second message when said position determining component cannot determine said geographic location within said pre-determined time parameter.

8. The position reporting device of claim 1, wherein said initiating component is selected from the group comprising an acceleration sensor, a tilt sensor, a vibration sensor, a rotation sensor, a gyroscope, and a motion sensor.

9. The position reporting device of claim 1, wherein said controller automatically causes said wireless communications component to transmit a third message when said initiating component does not detect movement of said position reporting device within a pre-determined time parameter.

10. The position reporting device of claim 1, wherein said controller automatically causes said wireless communications component to transmit a fourth message when said interrogator component can no longer automatically receive said identity.

11. A position tracking system comprising:
a data storage device disposed upon an asset for storing an identity which is unique to said asset;
a position tracking service provider; and
a position reporting device comprising:
a controller;
an interrogator component coupled with said controller for automatically communicating with said data storage device and receiving said identity;
a position determining component coupled with said controller and for determining a geographic location of said position reporting device using a position determining system;
a wireless communications component coupled with said controller and for transmitting a message conveying said identity and said geographic location to said position tracking service provider; and
an initiating component coupled with said controller for generating a signal to said controller when said initiating component detects movement of said position reporting device, wherein said controller activates said position reporting device in response to said signal.

12. The position tracking system of claim 11, wherein said position reporting device further comprises a housing defining a portable package, wherein said controller, said position determining component, said wireless communication component, and said initiating component are disposed within said housing.

13. The position tracking system of claim 11, wherein said position determining system is a satellite-based position determining system.

14. The position tracking system of claim 11, wherein said position determining system is a terrestrial-based position determining system.

15. The position tracking system of claim 11, wherein said controller automatically causes said position determining component to determine said geographic location using said position determining system in response to said signal.

16. The position tracking system of claim 15, wherein said controller automatically causes said wireless communications component to transmit said message to said position tracking service provider when said geographic location is determined within a pre-determined time parameter.

17. The position tracking system of claim 15, wherein said controller causes said wireless communications component to transmit a second message to said position tracking service provider when said geographic location cannot be determined within said pre-determined time period.

18. The position tracking system of claim 11, wherein said initiating component is selected from the group comprising an acceleration sensor, a tilt sensor, a vibration sensor, a rotation sensor, a gyroscope, and a motion sensor.

19. The position tracking system of claim 11, wherein said controller automatically causes said wireless communications component to transmit a third message to said position tracking service provider when said initiating component has not detected movement of said position reporting device within a pre-determined time parameter.

20. The position tracking system of claim 11 wherein said data storage device comprises a radio frequency identification (RFID) tag which is coupled with said asset.

21. The position tracking system of claim 11, wherein said controller automatically causes said wireless communications component to transmit a fourth message when said interrogator component can no longer automatically receive said identity.

22. A method for monitoring the geographic position of an asset, said method comprising:
detecting motion of a portable position reporting device using an initiating component disposed within said portable position reporting device;
indicating said motion to a controller disposed within said portable position reporting device;
activating said portable position reporting device in response to said indicating; and
automatically receiving an identity which is unique to said asset using an interrogator component disposed within said portable position reporting device.

23. The method as recited in claim 22, wherein said activating comprises:
transitioning from an idle operating state to an active operating state;
automatically performing a position determining operation wherein a geographic location of said position reporting device is determined; and
automatically transmitting said geographic location and said identity.

24. The method as recited in claim 23, wherein said activating further comprises automatically returning to said idle operating state after said performing of said position determining operation.

25. The method as recited in claim 23, wherein said activating further comprises automatically terminating said position determining operation when said position determining operation exceeds a pre-determined time parameter.

26. The method as recited in claim 23, wherein said position determining operation further comprises recording said geographic location in a memory disposed within said portable position reporting device.

27. The method as recited in claim 23, wherein said transmitting comprises transmitting said geographic location and said identity using a wireless communications device disposed within said portable position reporting device.

28. The method as recited in claim 23, wherein said position determining operation comprises utilizing a satellite-based position determining system to determine said geographic location of said portable position reporting device.

29. The method as recited in claim 23, wherein said position determining operation comprises utilizing a terrestrial-based position determining system to determine said geographic location of said portable position reporting device.

30. The method as recited in claim 22 further comprising:
storing said identity on a data storage device coupled with said asset.

31. The method as recited in claim 30 wherein said data storage device comprises a radio frequency identification (RFID) tag, and wherein said automatically receiving an identity further comprises:
wirelessly accessing said RFID tag using said interrogator component.

* * * * *